(12) United States Patent
Iwai et al.

(10) Patent No.: US 7,040,657 B2
(45) Date of Patent: May 9, 2006

(54) METHOD OF REDUCING NITROGEN OXIDE IN HYBRID INFLATOR

(75) Inventors: Yasunori Iwai, Osaka (JP); Masayuki Yamazaki, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 68 days.

(21) Appl. No.: 10/115,137

(22) Filed: Apr. 4, 2002

(65) Prior Publication Data

US 2003/0001369 A1    Jan. 2, 2003

(30) Foreign Application Priority Data

Apr. 4, 2001    (JP)    ............... 2001-105826

(51) Int. Cl.
*B60R 21/26*    (2006.01)

(52) U.S. Cl. .................................... 280/741
(58) Field of Classification Search ................ 280/736, 280/737, 741
See application file for complete search history.

(56) References Cited

U.S. PATENT DOCUMENTS

| | | | |
|---|---|---|---|
| 3,756,621 A * | 9/1973 | Lewis et al. ................ 280/741 |
| 5,551,725 A * | 9/1996 | Ludwig ....................... 280/737 |
| 5,827,996 A * | 10/1998 | Yoshida et al. ............... 149/45 |
| 5,857,699 A * | 1/1999 | Rink et al. ................... 280/737 |
| 5,898,126 A * | 4/1999 | Yoshida ......................... 149/46 |
| 5,970,703 A * | 10/1999 | Hinshaw et al. ............... 60/219 |
| 6,019,861 A * | 2/2000 | Canterberry et al. ........ 149/19.1 |
| 6,077,371 A * | 6/2000 | Lundstrom et al. ............. 149/37 |
| 6,127,564 A * | 10/2000 | Yoshida et al. ................ 556/45 |
| 6,132,480 A * | 10/2000 | Barnes et al. .................. 44/314 |
| 6,189,922 B1 * | 2/2001 | Parks et al. ................... 280/735 |
| 6,224,099 B1 * | 5/2001 | Nielson et al. ............... 280/741 |
| 6,237,950 B1 * | 5/2001 | Cook et al. ................... 280/736 |
| 6,302,979 B1 * | 10/2001 | Matsuoka et al. ............. 149/36 |
| 6,651,565 B1 * | 11/2003 | Yamato et al. ............... 102/531 |

FOREIGN PATENT DOCUMENTS

| | | |
|---|---|---|
| DE | 198 19 623 A1 | 11/1998 |
| EP | 0 673 809 A1 | 9/1995 |
| EP | 0 763 512 A1 * | 3/1997 |
| EP | 0794164 A1 | 9/1997 |
| EP | 0 783 469 B1 * | 7/1998 |
| EP | 0997450 A1 | 5/2000 |
| EP | 1 216 897 A1 | 6/2002 |
| EP | 1216897 A1 | 6/2002 |
| JP | 2002-166817 A | 6/2002 |
| WO | 98/06682 A | 2/1998 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP

(57) ABSTRACT

The present invention provides a method of reducing an amount of NOx generated in actuation of a hybrid inflator. The present invention is a method of reducing nitrogen oxide which is generated in actuation of a hybrid inflator for an inflatable safety system of a vehicle provided with an airbag, the inflator comprising an inflator housing charged with a pressurized medium, a gas generator which is accommodated in the inflator housing and has one or two or more gas generating chambers storing a gas generating agent including a fuel and an oxidizing agent, and an igniting means connected to the gas generator, wherein a reducing compound having at least a reducing function of a nitrogen oxygen is placed in the hybrid inflator.

24 Claims, 2 Drawing Sheets

METHOD OF REDUCING NITROGEN OXIDE IN HYBRID INFLATOR

TECHNICAL FIELD OF THE INVENTION

The present invention relates to a method of reducing a nitrogen oxide (NOx) in a hybrid inflator and a hybrid inflator in which a generated amount of nitrogen oxide (NOx) is reduced.

PRIOR ART

In a pyrotechnic inflator which inflates an air bag with a combustion gas from a gas generating agent, NOx is always produced because of a fuel component such as a nitrogen-containing compound or the like, and it is demanded to reduce a generated amount of NOx in view of safety of a passenger.

Meanwhile, a hybrid inflator inflates an air bag with an inert gas such as argon, helium, and, since a gas generating agent is used to increase an internal pressure, an amount of use thereof is less than that in the pyrotechnic inflator. Therefore, a problem caused by NOx generation is not so overt in the hybrid inflator as compared with the case of the pyrotechnic inflator, however, there is a demand for reducing an amount of NOx even in the hybrid inflator in view of further enhancing safety to a vehicle occupant and particularly protecting the weak such as infants or the aged.

DISCLOSURE OF THE INVENTION

An object of the present invention is to provide a method of reducing NOx generated in actuation of a hybrid inflator and a hybrid inflator in which a generated amount of NOx is reduced.

Though the applicant of the present invention previously filed an invention relating to a hybrid inflator which can achieve further reduction in size and weight (specification of Japanese Patent Application No. 2000-290236), the present invention has improved the previous invention and further applied an excellent NOx reducing effect.

The present invention reduces a generated amount of NOx by causing NOx to react with radicals, such as $NH_2$ radicals, NCO radicals, CN radicals, alkyl radicals generated from a reducing compound to change a portion of NOx to $N_2$ gas.

The present invention provides, as a solving means, a method of reducing nitrogen oxide which is generated in actuation of a hybrid inflator, comprising the step of placing a reducing compound having at least a reducing function of a nitrogen oxygen in the hybrid inflator for an inflatable safety system of a vehicle provided with an airbag, comprising an inflator housing charged with a pressurized medium, a gas generator which is accommodated in the inflator housing and has one or two or more gas generating chambers storing a gas generating agent including a fuel and an oxidizing agent, and an igniting means connected to the gas generator,.

The present invention provides, as other solving means, a hybrid inflator for an inflatable safety system of a vehicle provided with an airbag, which comprises an inflator housing charged with a pressurized medium, a gas generator accommodated in the inflator housing and having one or at least two gas generating chambers which store a gas generating agent including a fuel and an oxidizing agent, and an igniting means connected to the gas generator, wherein the gas generating agent has a gas generating function and a nitrogen oxide reducing function.

In the present invention, a pressurized medium such as an inert gas is employed in the hybrid inflator including a gas generating agent as a means inflate an inflatable body such as an air bag. And the present invention includes a hybrid inflator which increases an internal pressure with a gas generating agent, and also a hybrid inflator which increases an internal pressure with a gas generating agent and utilizes a combustion gas as an inflating means of an inflatable body.

In the method of reducing a nitrogen oxide of a hybrid inflator according to the present invention and the hybrid inflator using the same, it is desirable that the mole ratio (A/B) of an amount (A mol) of the pressurized medium and an amount (B mol) of gas generated by combustion of the gas generating agent is adjusted to preferably 8/2 to 1/9, and more preferably 8/2 to 3/7.

The pressurized medium can be a composition comprising an inert gas such as argon, helium, a nitrogen gas or the like. In this case, the argon works to promote the thermal expansion of the pressurized medium and, if the helium is included, the leakage of the pressurized medium can be detected easily so that distribution of the imperfect products can be prevented, which is preferable. In addition to the above-described composition, the pressurized medium can include oxygen to further promote a combustion and oxidize CO, hydrogen or the like to $CO_2$, $H_2O$ or the like. The specific composition of the pressurized medium including oxygen is determined depending on an amount and a kind of the adopted gas generating agent, but it is preferable that the oxygen content is 30 mole % or less. The charged pressure of the pressurized medium (=a pressure in the inflator housing) is preferably 10,000 to 70,000 kPa, and more preferably 30,000 to 60,000 kPa. The gas generating agent can include one generally used in a hybrid inflator.

As described above, by adjusting the mole ratio of the amount of the pressurized medium charged in the hybrid inflator and the amount of gas generated by combustion of the gas generating agent, the amount of the pressurized medium charged can be reduced. Thereby, even when the volume of the housing is decreased (in other words, the length and/or the width (diameter) of the housing is decreased), the same pressure as that before the volume is decreased can be maintained without elevating the charged pressure of the pressurized medium (=the internal pressure of the housing). Incidentally, in the present invention, the weight ratio (X/Y) of the weight (X) of the pressurized medium and the weight (Y) of the gas generating agent is preferably 0.1 to 7, and more preferably 0.5 to 5.

Also, in the present invention, it is desirable that a pressure index, at a time of combustion of the gas generating agent, which is defined by the following formula: $rb=\alpha P^n$ (in the formula, rb:burning rate, $\alpha$:coefficient, P:pressure, and n:pressure index), is less than 0.8. The pressure index (n) is more preferably 0.1 to 0.8, and further preferably 0.1 to 0.7. Incidentally, the pressure index n was obtained from two formulas of $rb1=\alpha P1^n$ and $rb2=\alpha P2^n$ after measuring the burning rate rb1 in a tank having a pressure P1 (70 kg/cm$^2$) and measuring the burning rate rb2 in the tank having a pressure P2 (100 kg/cm$^2$).

Thus, when the pressure index (n) is set to less than 0.8, since the burning rate in the initial stage of combustion of the gas generating agent is suppressed not to increase rapidly, the increase in an internal pressure of the housing is small. For this reason, even when the thickness of the housing is reduced, a sufficient pressure resistance can be maintained. Also, since the increase in an internal pressure of the housing is small (namely, a change of the internal pressure is small), the combustion of the gas generating agent is carried out stably, so that a combustion residue of the gas generating agent is not generated.

By employing the method of reducing NOx according to the present invention, an amount of NOx generated by combustion of the gas generating agent can be reduced. Also, the reducing compound used in the NOx reducing method of the present invention is superior in thermal stability to the conventional art using a reducing compound different from the present invention, and hardly generates toxic gases. Accordingly, by employing the method of reducing NOx according to the present invention and also by using the hybrid inflator of the present invention, the reliability and safety of the inflator system can further be enhanced.

PREFERRED EMBODIMENTS OF THE PRESENT INVENTION

First, a dual type hybrid inflator having two gas generating chambers will be explained with reference to FIG. 1 as one embodiment of a hybrid inflator according to the present invention. Naturally, the present invention is applicable to a single type hybrid inflator having one gas generating chamber or a hybrid inflator having three or more gas generating chambers. Also, since reducing an amount of NOx generated by combustion of a gas generating agent is an object of the present invention, the structure itself of the hybrid inflator is not limited to the one shown in FIG. 1, and it is applicable to other known hybrid inflators, and additionally, it can also include one modified by those skilled in the art by means of an ordinary modifying means.

Figure 1:
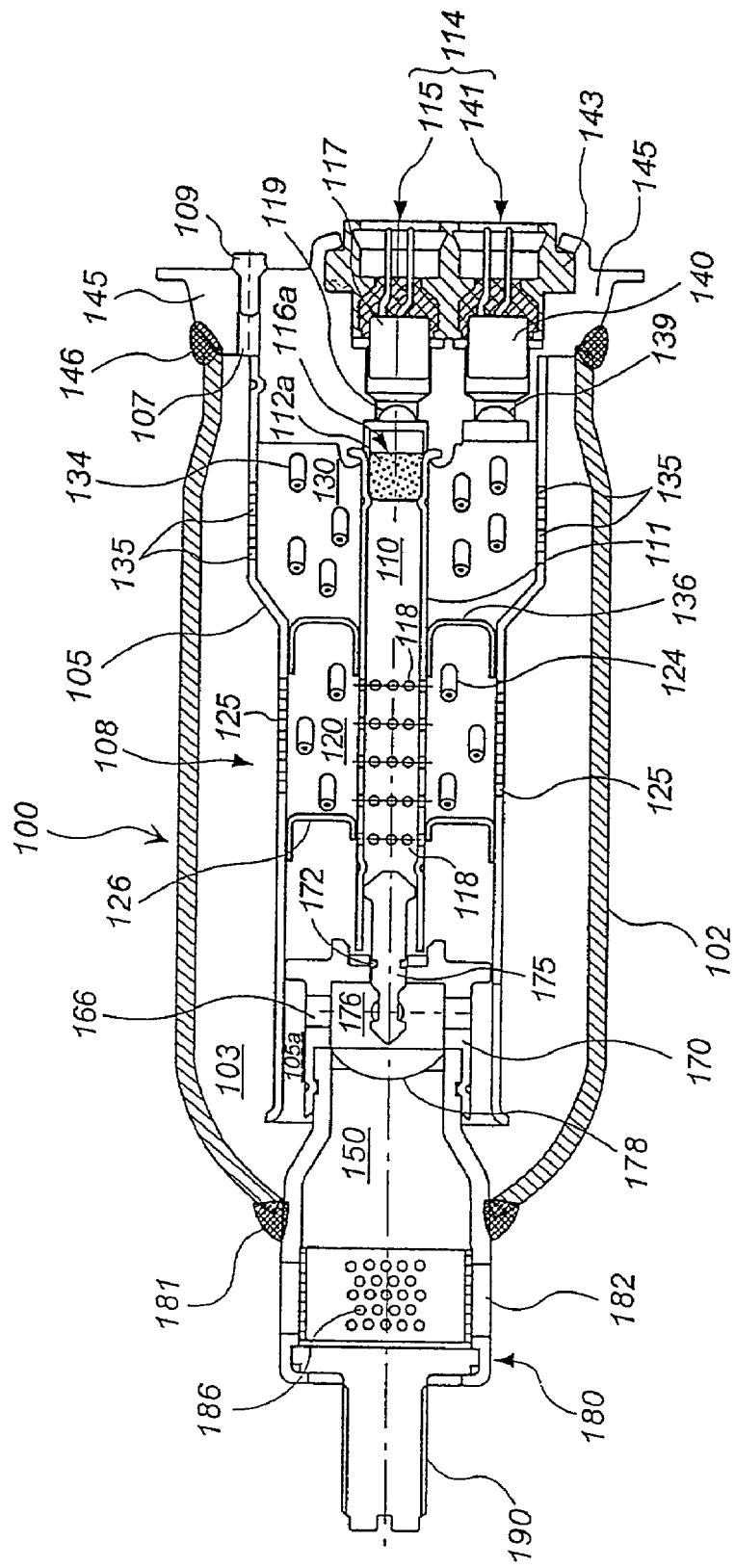
FIG. 1 is a vertical sectional view of a hybrid inflator of the present invention.

FIG. 1 is a sectional view of a hybrid inflator 100 in the longitudinal direction (axial direction). As shown in FIG. 1, an inflator housing 102 comprises a cylindrical container, and the inner space 103 thereof is charged with a pressurized medium and maintained at a high pressure. A reference numeral 107 denotes a small hole for charging a pressurized medium, and a reference numeral 109 denotes a seal pin.

A gas generator 108 has an outer shell formed with a gas generator housing 105 and has therein a charge-transferring chamber 110, and a first gas generating chamber 120 and a second gas generating chamber 130 which are defined in series and adjacent to each other in the longitudinal direction of the inflator housing 102 to surround the charge-transferring chamber 110. The gas generator 108 is arranged in the inflator housing 102, and one end of the gas generator 108 in the longitudinal direction is fixed to a boss 145 by welding.

The charge-transferring chamber 110 comprises a cylindrical housing 111, and is connected to a first igniter 117 through a first communication path closed by a booster cup 116a in which a booster agent (a transfer charge) 112a is charged and a first rupturable plate 119 as a first closing means. The charge-transferring chamber 110 is in communication with the first gas generating chamber 120 through a flame-transferring hole 118.

The first gas generating chamber 120 is disposed to surround the charge-transferring chamber 110, and is defined by the gas generator housing 105, the housing 111 of the charge-transferring chamber 110, a first partition wall (a first retainer) 126 and a second partition wall (a second retainer) 136. A required amount of a first gas generating agent 124 is accommodated in the first gas generating chamber 120. The first gas generating chamber 120 and the inflator housing 102 are in communication with each other through a plurality of first communication holes 125.

The second gas generating chamber 130 is defined by the gas generator housing 105, the housing 111 of the charge-transferring chamber 110, the second partition wall 136 and the boss 145. A required amount of a second gas generating agent 134 is accommodated in the second gas generating chamber 130. The second gas generating chamber 130 and the inflator housing 102 are in communication with each other through a plurality of second communication holes 135.

The second gas generating chamber 130 is connected to a second igniter 140 through a second communication path closed by a second rupturable plate 139 as a second closing means.

An amount of the second gas generating agent 134 may be equal to, or larger or smaller than that of the first gas generating agent 124. A shape and a composition of the second gas generating agent 134 may be the same as or different from those of the first gas generating agent 124. Also, volumes of the first gas generating chamber 120 and the second gas generating chamber 130 may be the same as or different from each other, and the volumes can be adjusted by the first partition wall 126 and the second partition wall 136.

As described above, the charge-transferring chamber 110 is in communication with the first gas generating chamber 120, the first gas generating chamber 120 is in communication with the inflator housing 102, and the second gas generating chamber 130 is in communication with the inflator housing 102. Therefore, the charge-transferring chamber 110, the first gas generating chamber 120 and the second gas generating chamber 130 are all maintained at a high pressure, i.e., at the same pressure as that of the interior (the inner space 103) of the inflator housing 102.

An igniting means chamber 114 formed in the boss 145 includes a first igniting means chamber 115 and a second igniting means chamber 141. The first igniting means chamber accommodates a first igniter 117 and the second igniting means chamber accommodates a second igniter 140. The first and second igniting means chambers can be aligned in parallel and adjacently to each other in the widthwise direction of the inflator housing 102.

The first igniter 117 and the second igniter 140 are mounted to the boss 145 through an igniter collar 143. The boss 145 is fixed to the inflator housing 102 at a connecting portion 146 by welding or the like.

An adapter 170 is connected in extension of the charge-transferring chamber 110, and a projectile 175 in the illustrated shape is mounted, through an O-ring 172, to an opening portion in which the charge-transferring chamber 110 and the adapter 170 are communicated with each other, straddling the charge-transferring chamber 110 and the adapter 170, and the projectile ruptures a principal rupturable plate 178 at actuation. A top end of the projectile 175 is positioned in the inner space 176 of the adapter 170. The inner space 176 and the inner space 103 of the inflator housing 102 are in communication with each other exclusively through a required number of gas inflow holes 166 formed on a surface of the adapter 170 which is opposite to an inner surface of the housing 105. Since a gas flow-path 105a is defined by an inner surface of the housing 105 and an outer surface of the adapter 170, the pressurized medium in the inner space 103 always flows into a gas inflow hole 166 through the gas flow-path 105a at activation.

A diffuser 180 is connected to one end of the inflator housing 102. The diffuser 180 is fixed at a connecting portion 181 by welding. The principal rupturable plate 178 as a principal closing means for closing a passage to a diffuser port 182 of the pressurized medium before actuation is disposed on one end, which faces the projectile 175, of the diffuser 180. Therefore, before activation, the inner space 103 and a gas inflow space 150 of the inflator housing 102 are completely separated and isolated from each other by the principal rupturable plate 178 and a flow of the pressurized medium is, therefore, prevented.

On the other end of the diffuser 180, a plurality of diffuser ports 182 for introducing the pressurized medium to the air bag and a diffuser screen 186 for removing fine particles are provided. And a stud bolt 190 for connecting to the air bag module is fixed to the outer surface.

The following is the description of the method of reducing NOx in the hybrid inflator according to the present invention with reference to FIG. 1.

The NOx reducing method of the present invention is to dispose a reducing compound having at least an NOx reducing function (hereinafter, referred to as "reducing compound") in the hybrid inflator 100 and at a place where the reducing compound can come in sufficient contact with NOx generated by combustion of the first gas generating agent 124 and the second gas generating agent 134. In addition to the NOx reducing function, the reducing compound may have as a function capable of utilizing a gas generated by decomposition of the reducing compound itself as an inflating medium for an air bag, namely, a gas generating function.

The reducing compound can be positioned inside the charge-transferring chamber 110, inside the first gas generating chamber 120 and the second gas generating chamber 130, in the vicinity of the first communication hole 125 and the second communication hole 135, a desired place in the inner space 103, the gas flow-path 105a, inside the gas inflow space 150, the diffuser screen 186, and the like. Among them, in order to enhance an NOx reducing effect, the reducing compound is desirably positioned inside one or both of the first gas generating chamber 120 and the second gas generating chamber 130.

When the reducing compound is arranged inside one or both of the first gas generating chamber 120 and the second gas generating chamber 130, the reducing compound is arranged together with a first gas generating agent 124 or a second gas generating agent 134 including a fuel and an oxidizing agent, and an arrangement method can be as follows:

First, a method of arranging a molded article obtained by molding a gas generating agent including a fuel and an oxidizing agent, and a reducing compound integrally.

Second, a method of arranging a mixture of a molded article of a gas generating agent including a fuel and an oxidizing agent, and a molded article of a reducing compound.

Third, a method of arranging a gas generating agent including a fuel and an oxidizing agent, and a reducing compound separately. In this case, the gas generating agent and the reducing compound may be molded articles or powder.

The molded article may be formed in a single-perforated cylindrical shape, a porous cylindrical shape or a pellet shape, and they can be produced by a method comprising the steps in which a gas generating agent component or a reducing compound is blended with other component such as a binder or the like as required, the blended material is added and mixed with water or an organic solvent, and the resulting material is extrusion-molded (into the molded articles of the single-perforated cylindrical shape and the porous cylindrical shape), or the resulting material is compression-molded using a pelletizer or the like (into the molded article of the pellet shape).

Figure 2:
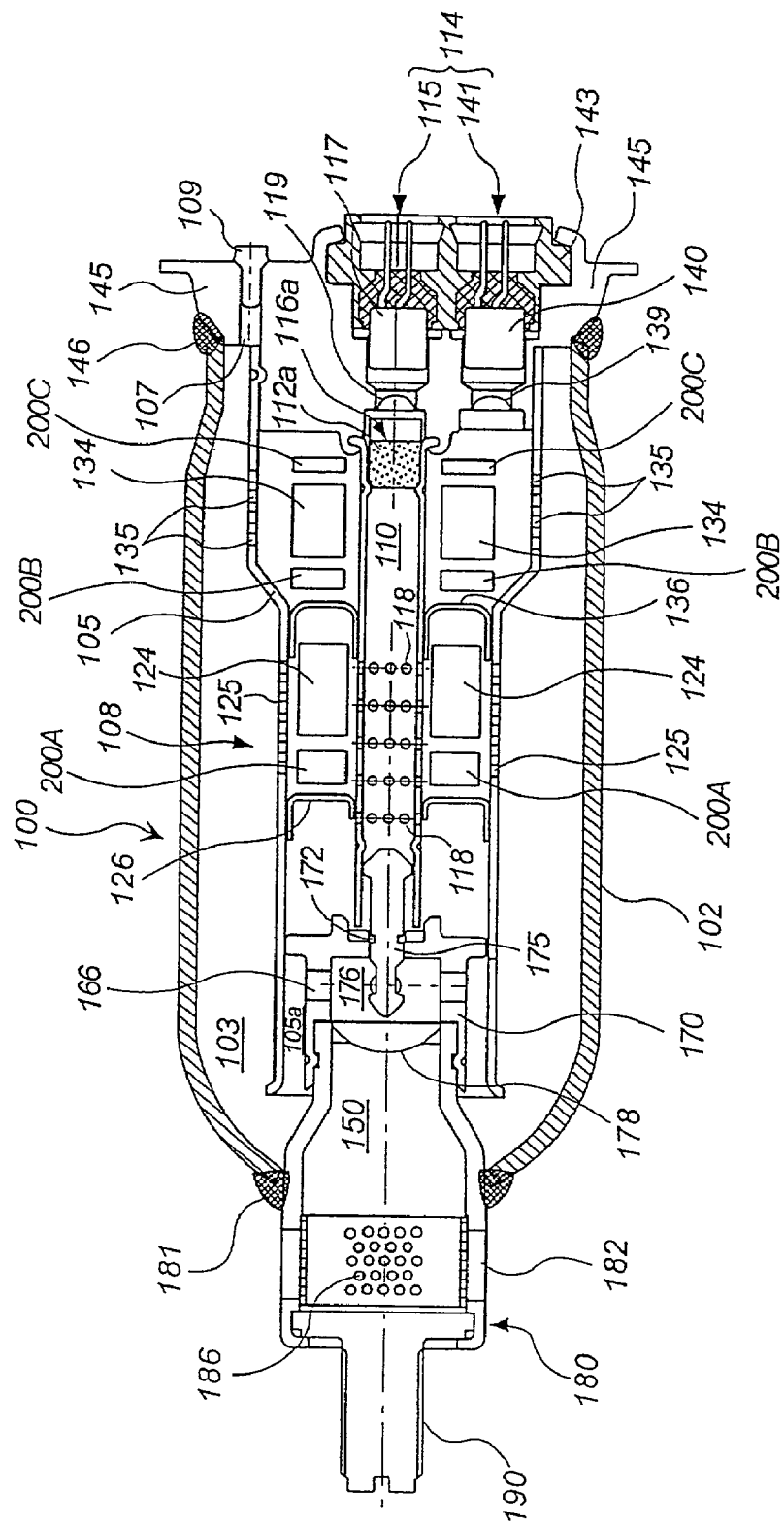
FIG. 2 is a vertical sectional view of other embodiment of the present invention.

Among the above-described the first to the third methods, the third method is desirable to enhance the NOx reducing effect. When the third method is employed, a desirable arrangement is shown in FIG. 2. FIG. 2 is a schematic diagram showing a arrangement of the first gas generating agent 124, the second gas generating agent 134 and the reducing compound 200.

As shown in FIG. 2, when the third method is employed, the reducing compound 200 can be arranged on one axial end of the first gas generating agent 124, and the reducing compound 200 can be arranged to interpose the second gas generating agent 134 at the axial ends thereof. In this case, the reducing compound 200 may be placed to interpose the first gas generating agent 124 at the axial ends, or it may be placed on one axial end of the second gas generating agent, or it may be placed to interpose the first gas generating agent 124 and the second gas generating agent 134 respectively at the axial ends thereof.

The following is a description of a hybrid inflator according to the present invention in which a generated amount of NOx is reduced with reference to FIG. 1 and FIG. 2.

In a hybrid inflator of the present invention, a gas generating agent has a gas generating function and a nitrogen oxide reducing function, and one or both of the first gas generating agent 124 stored in the first gas generating chamber 120 and the second gas generating agent 134 stored in the second gas generating chamber 130 have the gas generating function and the nitrogen oxide reducing function.

The first gas generating agent 124 and the second gas generating agent 134 include a fuel and an oxidizing agent, and a reducing compound, and they can be formed in the following three aspects:

First, the gas generating agent in which a fuel, an oxidizing agent and a reducing compound are included and formed integrally.

Second, the gas generating agent comprising a mixture of a molded article including a fuel and an oxidizing agent and a molded article including a reducing compound.

Third, the gas generating agent in which a fuel and an oxidizing agent are divided from a reducing compound and arranged separately in the gas generating chamber. In this case, the gas generating agent and the reducing compound may be a molded article or powder.

Among the first to third aspects, the third aspect is desirable to enhance the NOx reducing effect. When the third aspect is employed, a desirable arrangement is shown in FIG. 2, and the arrangement can be changed like the above-described third method.

As the gas generating agent accommodated in the single type hybrid inflator and the dual type hybrid inflator, it is possible to use a material including fuel and oxidizer, or fuel, oxidizer and slag-forming agent which are mixed together with bonding agent if necessary and formed into a desired shape. If such a gas generating agent is used, a gas generated by its combustion can be supplied together with the pressurized medium for developing the air bag. Especially when the gas generating agent including the slag-forming agent is used, the amount of mist discharged from the inflator can be reduced remarkably.

Preferably, the fuel can be one or two or more materials selected from a group consisting guanidine derivative such as nitroguanidine (NQ), guanidine nitrite (GN), guanidine carbonate, amino nitroguanicine, amino guanidine nitrite, amino guanidine carbonate, diamino guanidine nitrite, diamino guanidine carbonate, and triamino guanidine nitrite. Further as the fuel, one or two or more materials selected from a group comprising tetrazole and tetrazole derivative can be used.

As oxidizing agent, one or two or more materials selected from a group comprising strontium nitrate, potassium nitrate, ammonium nitrate, potassium perchlorate, copper oxide, ferrous oxide, basic copper nitrate can be used. Preferable composition amount of the oxidizing agent is 10 to 80 parts by weight, and more preferably, 20 to 50 parts by weight with respect to 100 parts by weight of fuel.

Preferably, the slag-forming agent can be one or two or more materials selected from a group consisting of acid clay, talc, bentonite, diatomaceous earth, kaolin, silica, alumina, sodium silicate, silicon nitride, silicon carbide, hydrotalsite, and a mixture thereof. Preferable composition amount of slag-forming agent is 0 to 50 parts by weight, and more preferably, 1 to 10 parts by weight with respect to 100 parts by weight of fuel.

Preferably, the bonding agent can be one or two or more materials selected from a group consisting of sodium salt of sodium carboxymethylcellulose, hydroxyethyl cellulose, starch, polyvinyl alcohol, guar gum, microcrystal cellulose, polyacrylamide and calcium stearate. Preferable composition amount of the bonding agent is 0 to 30 parts by weight, and more preferably, 3 to 10 parts by weight with respect to 100 parts by weight of fuel.

The reducing compound preferably has a high thermal stability and readily to generate radicals upon decomposition, and the reducing compound can be one or two or more selected from the group consisting of a compound including amide, guanidine derivatives, tetrazole derivatives, hydrazine derivatives, triazine derivatives, salts of hydroxylamine, sodium salts, ammonium salts, ammine complexes, cyanates and dicyanamide salts.

Such a reducing compound is at least one member selected from the group consisting of amide compounds such as azodicarbonamide (ADCA) and biurea; guanidine derivatives such as dicyandiamide (DCDA) and guanidine nitrate; tetrazole derivatives such as 5-aminotetrazole (5-AT) and 5-aminotetrazole metal salts; bitetrazole derivatives such as bitetrazol, bitetrazole metal salts and bitetrazole ammonium salts; hydrazine derivatives, e.g. trihydrazinotriazine (THT), carbohydrazide (CDH) complex, hydrazine complex and oxalyldihydrazide; triazine derivatives such as melamine; salts of hydroxylamine such as hydroxylamine oxalate and sodium salts such as sodium oxalate; cyanates such as sodium cyanate; ammonium salts such as ammonium molybdate; ammine complexes such as $Cu(NH_3)_4(NO_3)_2$; and dicyanamide salts such as sodium dicyanamide.

The reducing compound is preferably azodicarbonamide, dicyandiamide, 5-aminotetrazole, 5-aminotetrazole sodium salt, 5-aminotetrazole potassium salt, bitetrazole, bitetrazole ammonium salt, trihydrazinotriazine and the carbohydrazide complex because these materials are easily available and economical and have low toxicity.

Particularly preferred examples of the reducing compound are azodicarbonamide, or 5-aminotetrazole because they generate extremely efficiently the $NH_2$ radical ($\cdot NH_2$) as shown in the following reaction formulas.

(ADCA)

$$ADCA \rightarrow 2 \cdot CONH_2 + N_2$$

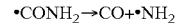
$$\cdot CONH_2 \rightarrow CO + \cdot NH_2$$

(5-AT)

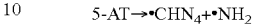
$$5\text{-}AT \rightarrow \cdot CHN_4 + \cdot NH_2$$

The reducing compound can be used in combination with a material (a reducing catalyst) functioning as a reducing catalyst. Examples of the materials as the reducing catalyst include copper oxide. An example of the combination of the reducing material and the reducing catalyst is the combination of 5-aminotetrazole and copper oxide. These compounds are preferably used as a mixture. When such a combination system is used as the reducing material, NOx is reduced by ammonia and amino radicals, etc. generated by the decomposition of 5-aminotetrazole, and is also reduced by the reaction between NOx and hydrogen, methane, etc, generated by the decomposition of 5-aminotetrazole. Therefore, the reducing effect can be enhanced synergistically, and the absolute amount of use of the reducing compound can be decreased. Furthermore, the ammonia concentration in the gas after the reduction can be prevented from becoming excessively high.

The preferred compounding ratio of the reducing compound and the reducing catalyst, when they are used in combination, is such that the reducing catalyst is 0.01 to 200 parts by weight and particularly preferably, 5 to 100 parts by weight on the basis of 100 parts by weight of the reducing compound.

The composition ratio of the fuel and the oxidizing agent is not limited specifically. A known compounding ratio can be employed, for example, the oxidizing agent is preferably 10 to 80 parts by weight, and more preferably, 20 to 50 parts by weight on the basis of 100 parts by weight of the fuel.

The composition ratio of the fuel and the reducing compound is such that the reducing compound is preferably 0.1 to 30 parts by weight, more preferably, 0.5 to 20 parts by weight, and further preferably, 5 to 10 parts by weight on the basis of 100 parts by weight of the fuel. When the content of the reducing compound is 0.1 parts by weight or more, the NOx reducing effect can be enhanced, and when the content is 30 parts by weight or less, combustion of the gas generating agent is not disturbed while maintaining an excellent NOx reducing effect.

EXAMPLES

Hereinafter, the present invention will be explained more in detail with reference to Examples, but it is not limited by these Examples.

Production Example 1

Water was added to 34 parts by weight of nitroguanidine, 50 parts by weight of strontium nitrate, 9 parts by weight of carboxymethyl cellulose sodium salt and 7 parts by weight of acid clay, and kneadingly mixed. The kneaded mixture was then extruded, cut and molded to a mold having an outer diameter of 2.5 mm, an inner diameter of 0.8 mm and a length of 2.25 mm. The mold was sufficiently dried to give a gas generating agent. Examples 1 to 3 & Comparative Example 1

A hybrid inflator 100 having a structure such as shown in FIG. 1 was used. An inflator housing 102 of the hybrid inflator 100 was manufactured by using a high tensile strength steel (tensile strength: 90 kg/mm$^2$)

As the pressurized medium, 2.6 moles (100 g) (internal pressure of 32,000 kPa) of a mixture gas of argon and helium [Ar:He=96:4 (mole ratio)] was used. As the gas generating agent, 20 g thereof and 20 g thereof (the total amount of 40 g corresponds to the amount of gas generation of 1.0 mole) were used in the first gas generating chamber and in the second gas generating chamber (A/B=7.2/2.8) respectively. The weight ratio (X/Y) of the pressurized medium and the gas generating agent was 2.5. Thereby, the gas of 3.6 moles was used in actuation, so that the total weight of the pressurized medium and the gas generating agent before actuation was 140 g. Incidentally, the pressure index (n) of this gas generating agent was 0.6.

Also, in order to apply the NOx reducing effect, 3.5 g of reducing material (5-AT) in powder form shown in Table 1 was placed at a position 200A in Example 1, it was placed at a position 200B in Example 2, and it is placed at a position 200C in Example 3, as shown in FIG. 2.

The hybrid inflator 100 constituted in the above manner had a diameter of 59 mm, a length of 156 mm (which is a length except for the stud bolt 190, where the length of the stud bolt 190 is 20 mm). The thickness of the inflator housing 102 was 2.5 mm and the total weight thereof was about 1,200 g.

A combustion test was conducted using the hybrid inflator 100, and an NOx reducing effect was tested. Incidentally, the combustion test was conducted at room temperature by installing the hybrid inflator using the gas generating agent and 1g of an enhancer (reference numeral 112a in FIG. 1, B/KNO3) into a 2,800-liter tank. The test was carried out two times for each Example. The ignition of the second igniter 140 was delayed till 30 msec after the ignition of the first igniter 117. Analysis of NOx or the like was conducted using a detector tube at 30 minutes after the start of the activation of the hybrid inflator 100. The result is shown in Table 1.

lar member, said tubular member defining therein a charge transferring chamber;

providing in the gas generating chamber a body of gas generating agent including a fuel and an oxidizing agent;

providing within the gas generating chamber a body of reducing compound capable of reducing nitrogen oxide that is separate from the body of gas generating agent such that the body of reducing compound and the body of gas generating agent are located together adjacent said tubular member and directly facing the plurality of flame transferring holes, and introducing the combustion product into the gas generating chamber.

2. The method of reducing nitrogen oxide according to claim 1 comprising: mixing the body of gas generating agent and the body of the reducing compound in said gas generating chamber.

3. The method of reducing nitrogen oxide according to claim 1, wherein the step of providing the body of reducing compound includes: providing the body of reducing compound including at least one member selected from the group consisting of amide, guanidine derivatives, tetrazole derivatives, hydrazine derivatives, triazine derivatives, hydroxylamine salts, sodium salts, ammonium salts, amine complexes, cyanates and dicyanamide salts.

4. The method of reducing nitrogen oxide according to claim 1, wherein the step of providing the body of reducing compound includes providing the body of reducing compound including azodicarbonamide, dicyandiamide, 5-aminotetrazole or its salt, or bitetrazole or its salt.

5. The method of reducing nitrogen oxide according to claim 1, wherein said step of providing the body of reducing compound includes providing the body of reducing compound which is present in an amount of 0.1 to 30 parts by weight on the basis of 100 parts by weight of the fuel.

6. The method of reducing nitrogen oxide of a hybrid inflator according to claim 1, wherein at least one of the following requirements (1) to (3) are met:

TABLE 1

|  | Comparative Example | | Example 1 | | Example 2 | | Example 3 | |
| --- | --- | --- | --- | --- | --- | --- | --- | --- |
|  | 1st time | 2nd time | 1st time | 2nd time | 1st time | 2nd time | 1st time | 2nd time |
| reducing compound | none | none | 5-AT | 5-AT | 5-AT | 5-AT | 5-AT | 5-AT |
| position of the reducing compound | — | — | first gas generating chamber | first gas generating chamber | second gas generating chamber | second gas generating chamber | second gas generating chamber | second gas generating chamber |
| NO$_2$ (ppm) | 32.7 | 28.7 | 0.3 | 0.3 | 0.3 | 0.3 | 0.3 | 0.3 |
| NO (ppm) | 73.3 | 70.0 | 48.3 | 48.3 | 51.7 | 51.7 | 55.0 | 55.0 |

The invention claimed is:

1. A method of reducing nitrogen oxide generated upon actuation of a hybrid inflator for an inflatable safety system of a vehicle provided with an airbag including an inflator housing charged with a pressurized medium, a gas generator which is accommodated in the inflator housing and has at least one gas generating chamber, and an igniting means connected to the gas generator for generating a combustion product, comprising:

providing in the gas generating chamber a tubular member including a plurality of flame transferring holes disposed axially and circumferentially about said tubu- (1) a mole ratio of an amount (A mole) of the pressurized medium and an amount (B mole) of gas generated by combustion of the body of gas generating agent being 8/2 to 1/9;

(2) the weight ratio (X/Y) of a weight (X) of the pressurized medium and a weight (Y) of the body of gas generating agent being 0.1 to 7; and (3) the pressure index defined by the following formula at a time of combustion of the body of gas generating agent being less than 0.8:

rb =αp$^n$ wherein in the formula, rb denotes burning rate, α denotes coefficient, p denotes pressure, and n denotes pressure index.

7. A hybrid inflator for an inflatable safety system of a vehicle provided with an airbag, comprising:
 an inflator housing charged with a pressurized medium;
 a gas generator accommodated in the inflator housing and having at least one gas generating chamber and including a body of gas generating agent;
 a tubular member including a plurality of flame transferring holes disposed both axially and circumferentially about said tubular member and provided within the gas generating chamber;
 igniting means connected to the gas generator and generating a combustion product into the gas generating chamber through the plurality of flame transferring holes in said tubular member; and
 a body of reducing compound capable of reducing nitrogen oxide separate from the body of gas generating agent provided within the at least one gas generating chamber such that the body of reducing compound and the body of gas generating agent are located together in said at least one gas generating chamber adjacent said tubular member and directly facing the plurality of flame transferring boles.

8. A hybrid inflator according to claim 7, wherein a mixture of the body of gas generating agent and the body of reducing compound are placed in said gas generating chamber.

9. A hybrid inflator according to claim 7, wherein the body of reducing compound is comprised of at least one member selected from the group consisting of amide, guanidine derivatives, tetrazole derivatives, hydrozine derivatives, triazine derivatives, hydroxylamine salts, sodium salts, ammonium salts, amine complexes, cyanates and dicyanamide salts.

10. A hybrid inflator according to claim 7, wherein the body of reducing compound comprises azodicarbonamide, dicyandiamide, 5-aminotetrazole or its salt, or bitetrazole or its salt.

11. A hybrid inflator according to claim 7, wherein said body of reducing compound is present in an amount of 0.1 to 10 parts by weight on the basis of 100 parts by weight of the fuel.

12. A hybrid inflator according to claim 7, wherein at least one of the following requirements (1) to (3) are met:
 (1) a mole ratio of an amount (A mole) of the pressurized medium and an amount (B mole) of gas generated by combustion of the body of gas generating agent being 8/2 to 1/9;
 (2) the weight ratio (X/Y) of a weight (X) of the pressurized medium and a weight (Y) of the body of gas generating agent being 0.1 to 7; and
 (3) the pressure index defined by the following formula at a time of combustion of the body of gas generating agent being less than 0.8:
 $rb = \alpha p^n$ wherein in the formula, rb denotes burning rate, $\alpha$ denotes coefficient, p denotes pressure, and n denotes pressure index.

13. A method of reducing nitrogen oxide generated upon actuation of a hybrid inflator for an inflatable safety system of a vehicle provided with an airbag including an inflator housing charged with a pressurized medium, a gas generator which is accommodated in the inflator housing and has at least one gas generating chamber, and an igniting means connected to the gas generator for generating a combustion product, comprising:
 providing at least one port for passing the combustion product therethrough into the at least one gas generating chamber;
 providing in the gas generating chamber a body of gas generating agent including a fuel and an oxidizing agent such that the body of gas generating agent directly faces said at least one port;
 providing within the gas generating chamber a body of reducing compound capable of reducing nitrogen oxide that is separate from the body of gas generating agent and is positioned such that the body of reducing compound directly faces said at least one port, and
 causing said combustion product to pass into the gas generating chamber through said at least one port into direct contact with each said gas generating agent and said reducing compound.

14. The method of reducing nitrogen oxide according to claim 13 comprising: mixing the body of gas generating agent and the body of the reducing compound in said gas generating chamber.

15. The method of reducing nitrogen oxide according to claim 13, wherein the step of providing the body of reducing compound includes: providing the body of reducing compound including at least one member selected from the group consisting of amide, guanidine derivatives, tetrazole derivatives, hydrazine derivatives, triazine derivatives, hydroxylamine salts, sodium salts, ammonium salts, amine complexes, cyanates and dicyanamide salts.

16. The method of reducing nitrogen oxide according to claim 13, wherein the step of providing the body of reducing compound includes providing the body of reducing compound including azodicarbonamide, dicyandiamide, 5-aminotetrazole or its salt, or bitetrazole or its salt.

17. The method of reducing nitrogen oxide according to claim 13, wherein said step of providing the body of reducing compound includes providing the body of reducing compound which is present in an amount of 0.1 to 30 parts by weight on the basis of 100 parts by weight of the fuel.

18. The method of reducing nitrogen oxide of a hybrid inflator according to claim 13, wherein at least one of the following requirements (1) to (3) are met:
 (4) a mole ratio of an amount (A mole) of the pressurized medium and an amount (B mole) of gas generated by combustion of the body of gas generating agent being 8/2 to 1/9;
 (5) the weight ratio (X/Y) of a weight (X) of the pressurized medium and a weight (Y) of the body of gas generating agent being 0.1 to 7; and
 (6) the pressure index defined by the following formula at a time of combustion of the body of gas generating agent being less than 0.8:
 $rb = \alpha p^n$ wherein in the formula, rb denotes burning rate, $\alpha$ denotes coefficient, p denotes pressure, and n denotes pressure index.

19. A hybrid inflator for an inflatable safety system of a vehicle provided with an airbag, comprising:
 an inflator housing charged with a pressurized medium;
 a gas generator accommodated in the inflator housing and having at least one gas generating chamber defining therein a single space;
 igniting means connected to the gas generator and generating a combustion product into the gas generating chamber; and
 at least one port provided within the gas generator for the combustion product to pass therethrough into the gas generating chamber;
 a body of gas generating agent provided within the at least one gas generating chamber such that the body of gas generating agent directly faces said at least one port and the combustion product is in direct contact with the body of gas generating agent;

a body of reducing compound capable of reducing nitrogen oxide that is separate from the gas generating agent provided within the at least one gas generating chamber and is positioned such that the body of reducing compound directly faces said at least one port and the combustion product is in direct contact with the body of reducing compound.

20. A hybrid inflator according to claim 19, wherein a mixture of the body of gas generating agent and the body of reducing compound are placed in said gas generating chamber.

21. A hybrid inflator according to claim 19, wherein the body of reducing compound is comprised of at least one member selected from the group consisting of amide, guanidine derivatives, tetrazole derivatives, hydrozine derivatives, triazine derivatives, hydroxylamine salts, sodium salts, ammonium salts, amine complexes, cyanates and dicyanamide salts.

22. A hybrid inflator according to claim 19, wherein the body of reducing compound comprises azodicarbonamide, dicyandiamide, 5-aminotetrazole or its salt, or bitetrazole or its salt.

23. A hybrid inflator according to claim 19, wherein said body of reducing compound is present in an amount of 0.1 to 10 parts by weight on the basis of 100 parts by weight of the fuel.

24. A hybrid inflator according to claim 19, wherein at least one of the following requirements (1) to (3) are met:

(4) a mole ratio of an amount (A mole) of the pressurized medium and an amount (B mole) of gas generated by combustion of the body of gas generating agent being 8/2 to 1/9;

(5) the weight ratio (X/Y) of a weight (X) of the pressurized medium and a weight (Y) of the body of gas generating agent being 0.1 to 7; and (6) the pressure index defined by the following formula at a time of combustion of the body of gas generating agent being less than 0.8:

$rb = \alpha p^n$ wherein in the formula, rb denotes burning rate, $\alpha$ denotes coefficient, p denotes pressure, and n denotes pressure index.

* * * * *